US008990161B1

(12) United States Patent
Singhal et al.

(10) Patent No.: US 8,990,161 B1
(45) Date of Patent: Mar. 24, 2015

(54) SYSTEM AND METHOD FOR SINGLE SEGMENT BACKUP

(75) Inventors: Upanshu Singhal, Bangalore (IN); Sudha Narayanan, Bangalore (IN); Yash Karakalli Sannegowda, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 1119 days.

(21) Appl. No.: 12/242,259

(22) Filed: Sep. 30, 2008

(51) Int. Cl.
G06F 17/30 (2006.01)
G06F 11/14 (2006.01)

(52) U.S. Cl.
CPC .................................. *G06F 11/1458* (2013.01)
USPC .......................................................... 707/646

(58) Field of Classification Search
None
See application file for complete search history.

(56) References Cited

U.S. PATENT DOCUMENTS

| 5,642,496 | A  | * | 6/1997  | Kanfi ............................. 711/162 |
| 5,907,672 | A  | * | 5/1999  | Matze et al. ......................... 714/8 |
| 6,141,773 | A  | * | 10/2000 | St. Pierre et al. ................ 714/20 |
| 6,928,526 | B1 | * | 8/2005  | Zhu et al. ........................ 711/154 |
| 7,085,962 | B1 | * | 8/2006  | Hamilton et al. ................ 714/15 |
| 7,343,518 | B2 | * | 3/2008  | Yeo ................................ 714/18 |
| 7,606,868 | B1 | * | 10/2009 | Le et al. .......................... 709/211 |
| 7,623,848 | B2 | * | 11/2009 | Rosenfelt et al. ........... 455/412.1 |
| 7,631,220 | B1 | * | 12/2009 | Hamilton et al. ................ 714/15 |
| 7,650,341 | B1 | * | 1/2010  | Oratovsky et al. ........ 707/999.01 |
| 7,685,459 | B1 | * | 3/2010  | De Spiegeleer et al. ...... 714/6.12 |
| 7,725,438 | B1 | * | 5/2010  | Shah et al. ...................... 707/646 |
| 2002/0059505 | A1 | * | 5/2002  | St. Pierre et al. ............. 711/162 |
| 2004/0078641 | A1 | * | 4/2004  | Fleischmann ...................... 714/6 |
| 2004/0098547 | A1 | * | 5/2004  | Ofek et al. ..................... 711/162 |
| 2005/0003807 | A1 | * | 1/2005  | Rosenfelt et al. ........... 455/414.4 |
| 2005/0027955 | A1 | * | 2/2005  | Lam et al. ..................... 711/162 |
| 2005/0071392 | A1 | * | 3/2005  | Sandorfi et al. ............... 707/204 |
| 2005/0165853 | A1 | * | 7/2005  | Turpin et al. .................. 707/200 |
| 2006/0143497 | A1 | * | 6/2006  | Zohar et al. ........................ 714/4 |
| 2006/0155674 | A1 | * | 7/2006  | Traut et al. ........................ 707/2 |
| 2006/0161811 | A1 | * | 7/2006  | Welts ............................. 714/15 |
| 2007/0043749 | A1 | * | 2/2007  | Gerber et al. ................. 707/101 |
| 2007/0180307 | A1 | * | 8/2007  | Zohar et al. ........................ 714/6 |
| 2008/0059736 | A1 | * | 3/2008  | Murayama et al. ........... 711/162 |
| 2008/0172542 | A1 | * | 7/2008  | Kaushik ......................... 711/202 |
| 2008/0184063 | A1 | * | 7/2008  | Abdulvahid ....................... 714/6 |
| 2008/0307019 | A1 | * | 12/2008 | Weiss et al. ................... 707/204 |
| 2009/0307286 | A1 | * | 12/2009 | Laffin ........................... 707/204 |
| 2009/0327628 | A1 | * | 12/2009 | Narayanan et al. ........... 711/162 |

OTHER PUBLICATIONS

Gummadi, K.P.; Pradeep, M.J.; Murthy, C.S.R.; , "An efficient primary-segmented backup scheme for dependable real-time communication in multihop networks," Networking, IEEE/ACM Transactions on , vol. 11, No. 1, pp. 81-94, Feb. 2003.*
Saradhi, C.V.; Gurusamy, M.; Luying Zhou; , "Segment-Based Partial Protection Scheme for Routing Reliability Guaranteed Connections in WDM Optical Networks," Broadband Communications, Networks and Systems, 2006. BROADNETS 2006. 3rd International Conference on , vol., No., pp. 1-8, Oct. 1-5, 2006.*

* cited by examiner

*Primary Examiner* — Richard Bowen
(74) *Attorney, Agent, or Firm* — Dergosits & Noah LLP; Todd A. Noah

(57) ABSTRACT

The invention is a system and method for backing up a single segment and/or database on a host server. Present backups of database servers only allow full backups of the entire host server. If there are errors with any of the backed up segments or databases, this can only be corrected by re-running the entire backup process, which is very time consuming and tedious. The invention is a method for identifying and isolating single segments on the host server. In this fashion, if only one segment was not backup up correctly, then once identified and repaired, that segment may be backed up. By isolating single segments, only a segment that was not backed up correctly can be replicated. This increases the granularity of the backup system and minimizes the need to backup the entire host, saving time and cost.

10 Claims, 4 Drawing Sheets

SYSTEM AND METHOD FOR SINGLE SEGMENT BACKUP

FIELD

The present invention relates generally to backing up and restoring computer data, and specifically, to systems and methods for backing up only a desired portion of a storage area network.

BACKGROUND

Many organizations, such as large businesses and governmental entities, have extremely large databases of information that must be readily available for rapid access and modification. These databases can contain terabytes of data and require large data storage systems containing multiple disk drives or arrays of disk drives organized into a single large logical memory system. Accordingly, the demand for uninterrupted access to data generates a need for software and hardware that can adequately store and protect data from events such as system failures, viruses, power outages, etc.

Further, in specific industries these needs are exacerbated. For example, in health service industries, a wide variety of data must be stored in databases. Given the potential for severe consequences, data associated with patient's health and care must be maintained at the highest integrity. Moreover, governmental regulations associated with health care, such as the Health Insurance Portability and Accountability Act (HIPAA), impose significant administrative burdens to health care data. In addition, due to confidentiality concerns, much of this data is often encrypted which adds to the complexity of managing the databases.

In view of these potential problems, it is important that data is reliably protected. This is typically accomplished through the use of software that backs up the data. As the amount of data continues to increase, backing up the data becomes more complex. Large amounts of data cannot currently be quickly transferred from one volume to a backup volume and taking a volume of data offline for backup purposes is an unattractive option, requiring sophisticated strategies to maximize the availability of the data.

Commercial utility programs are available for performing backup operations, often running on a backup server which communicates with database servers via a network. Although this architecture does remove a considerable amount of load from the main database servers, the dedicated backup server must still process and transfer the large volumes of data.

To improve performance, many backup and recovery applications (BURAs) utilize an image-based as opposed to a file-based approach. With a file-based backup process, individual files are simply selected and copied. However, files are written to whichever sectors of the disk or partition that happen to be open at the time to maximize disk storage. This can result in the data of each file being spread across the physical medium of the disk in a non-contiguous manner. Accordingly, reading and writing such files requires non-sequential disk access operations which increases the time required. Since large databases can have tens or hundreds of thousands of files, a file-based backup greatly magnifies the time penalty associated with these non-sequential operations.

In contrast, an image-based backup allows the data to be written sequentially as the goal is to replicate the entire partition or drive. Accordingly, this approach provides a significant improvement in terms of the time required to create an entire backup image.

Nevertheless, given the significant amount of time necessary to perform a backup of these large databases, it is desirable to minimize the number of times a full backup is performed. As can be appreciated, sometimes a portion of the information involved in a backup is unsuccessfully stored. Unfortunately, conventional utilities often require a complete rerun of the backup process for the entire host or group of hosts associated with the corrupted data. As discussed above, the size of the databases requires substantial system resources to perform backups and having to repeat a full backup places significant strain on the system.

What is therefore needed is a back up and recovery application that minimizes the amount of time needed to maintain accurate backup copies of large databases. What is further needed is a BURA capable of minimizing the amount of data copied when correcting an unsuccessful backup operation.

BRIEF DESCRIPTION OF THE FIGURES

The present invention is illustrated by way of example and not limitation in the figures of the accompanying drawings, in which like references indicate similar elements, and in which.

DETAILED DESCRIPTION

Figure 1:
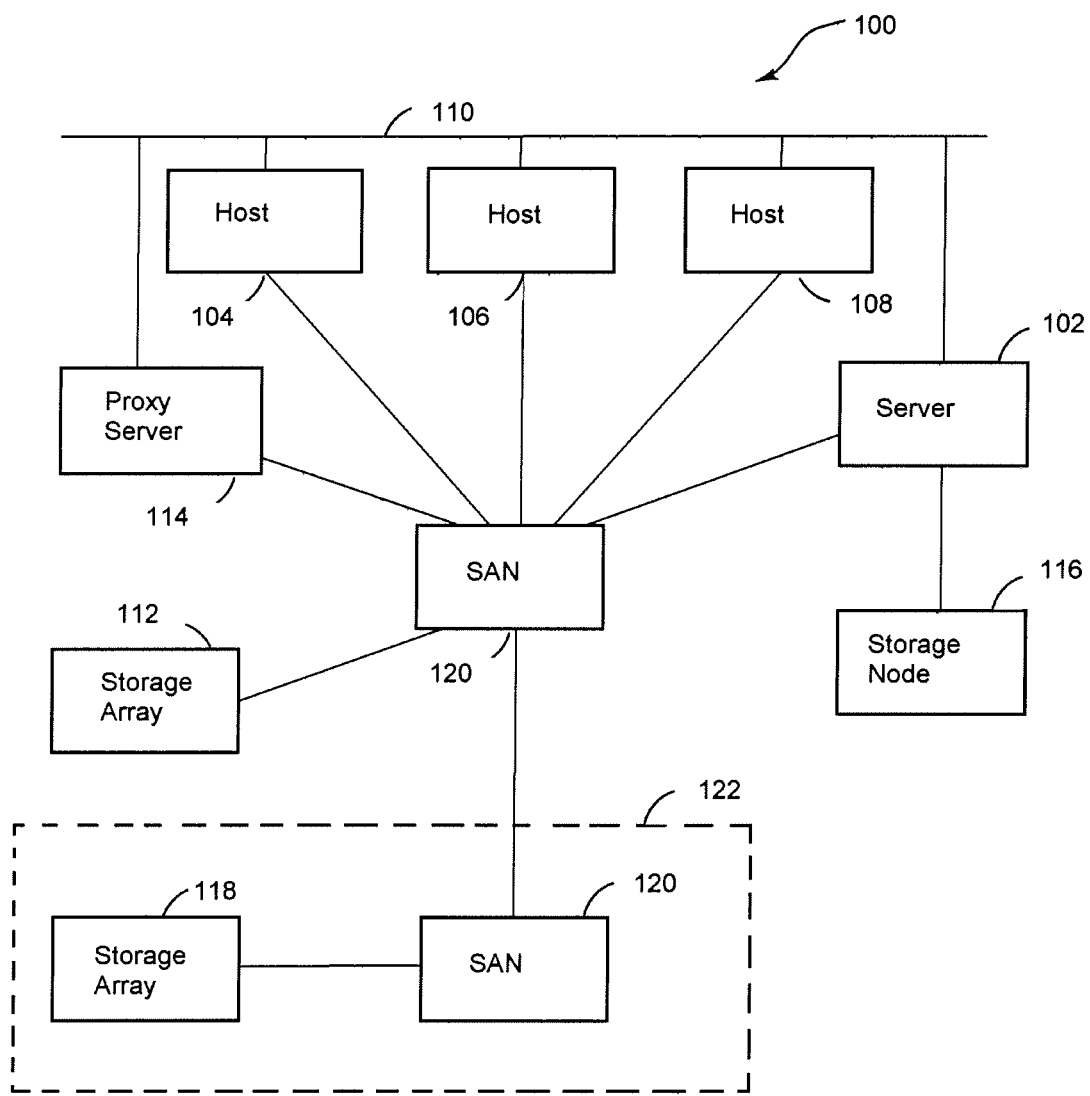
FIG. 1 is an exemplary block diagram depicting an embodiment of the present invention.

The invention is a system, method and computer readable media having instructions for backing up data and for enabling backup of only a single data segment, thereby allowing correction of the backup copy without requiring a full backup of the entire database or saveset.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

One aspect of the invention is a method for backing up data in a computer network system that includes one or more hosts having data stored in a plurality of segments, wherein the one or more hosts are in communication with a server that stores a backup copy of data from the one or more hosts, a storage array for storing the backup copy of data, and a proxy server relaying commands associated with backing up the data between the one or more hosts, the server, the storage array and the proxy server. The method comprises creating a full backup copy of data from the one or more hosts, selecting a single segment of data stored on the one or more hosts, specifying a saveset name that identifies the single segment of data, creating a single segment backup using the saveset name, and replacing the corresponding segment of the full backup with the single segment backup. The method involves specifying a saveset name that includes a coherency group name, a host name and/or a segment name.

In an embodiment, backup data is stored on the storage array in a set of production data and a set of clone data that mirrors the production data. Creating a single segment backup in the noted embodiment further comprises uncoupling the production data and the clone data, replicating a single segment of data from the clone data and synchronizing the production data and the clone data. Uncoupling the production data and the clone data is performed only on a host that contains single segment of data. Also, creating a single segment backup comprises building a backup list for the single segment.

In another aspect of the invention, a computer readable medium is provided for use in a computer network system that includes one or more hosts having data stored in a plurality of segments, wherein the one or more hosts are in communication with a server that stores a backup copy of data from the one or more hosts, a storage array for storing the backup copy of data, and a proxy server relaying commands associated with backing up the data between the one or more hosts, the server, the storage array and the proxy server. The computer readable medium has computer executable instructions for creating a full backup copy of data from the one or more hosts, selecting a single segment of data stored on the one or more hosts, specifying a saveset name that identifies the single segment of data, creating a single segment backup using the saveset name, and replacing the corresponding segment of the full backup with the single segment backup. The instructions are configured to specify a saveset name that includes a coherency group name, a host name and/or a segment name.

In an embodiment, backup data is stored on the storage array in a set of production data and a set of clone data that mirrors the production data. The computer readable medium has instructions for uncoupling the production data and the clone data, replicating a single segment of data from the clone data and synchronizing the production data and the clone data. The instructions for uncoupling the production data and the clone data uncouple only a host that contains single segment of data. Also, the instructions further comprise building a backup list for the single segment.

In yet another aspect of the invention, a computer network system having one or more hosts having data stored in a plurality of segments in communication with a server that stores a backup copy of data from the one or more hosts, a storage array for storing the backup copy of data, and a proxy server relaying commands associated with backing up the data between the one or more hosts, the server, the storage array and the proxy server is provided. The system is configured create a full backup copy of data from the one or more hosts, to select a single segment of data stored on the one or more hosts, to specify a saveset name that identifies the single segment of data, to create a single segment backup using the saveset name, and to replace or add the corresponding segment of the full backup with the single segment backup. The system is configured to specify a saveset name that includes a coherency group name, a host name and/or a segment name.

In an embodiment, backup data is stored on the storage array in a set of production data and a set of clone data that mirrors (i.e., is coupled to) the production data. The system is configured to uncouple the production data and the clone data, to replicate a single segment of data from the clone data and to synchronize the production data and the clone data. The system is configured to uncouple only a host that contains single segment of data. Also, the system is configured to build a backup list for the single segment.

FIG. 1 illustrates an exemplary system 100 for backing up network data that can be adapted for use with the invention. Although the system of FIG. 1 can be used to back up data according to the invention, embodiments of the invention can also be practiced in other networks that have data to be backed up. FIG. 1 illustrates a backup server 102 running a backup and recovery application having features of the invention. Server 102 may be connected over network 110 with hosts 104, 106, and 108. Alternatively, one will appreciate that server 102 may be connected to a proxy server 114, which may be then connected over network 110 to hosts 104, 106 and 108. Each host 104, 106, and 108 may have data on a storage volume that is local and/or remote with respect to the respective host. The storage volume represents one or more volumes or drives of the host as well as applications and services. Each host can be relatively simple (e.g., a desktop computer) or relatively complex (e.g., a large database server or a cluster of servers). Typically, server 102 and hosts 104, 106 and 108 communicate via a local area network (LAN) 110, although other network links can be used as well.

Computer system network 100 includes a disk storage array 112, such as the Symmetrix™ or CLARiiON™ family of data storage systems manufactured by EMC Corporation of Hopkinton, Mass., the assignee of the present invention. One will appreciate that storage array 112 may also be a tape storage array, and that reference to storage array 112 as a disk storage array is merely exemplary and not intended to limit the invention in any way. Storage array 112 maintains data in paired volumes including production or source data representing data that is actively being read and written by hosts 104, 106 and 108 and clone data representing a mirror image of the production data. In Symmetrix arrays, production data is stored on standard (STD) volumes and clone data is stored on business continuance volumes (BCV).

In an embodiment, computer system network 100 also includes a proxy server 114 that is configured to interact with the specific database application running on hosts 104, 106 and 108.

Additionally, computer system network 100 includes a storage node 116 that is controlled by server 10, or alternatively proxy server 114. Storage node 116 utilizes a stable, non-volatile storage medium to provide historical or archival backups, such as optical storage, magnetic cassettes, tape drives, disk storage or other suitable media.

Computer system network 100 can also include a remotely-located tape or disk storage array 118 configured for disaster recovery.

Together, the above-noted elements of computer system network 100 are linked to form storage area network (SAN) 120. The SAN architecture allows the hosts and servers to access the different storage devices across the network as though they were local.

Computer system network 100 allows operation of a BURA on server 102 and proxy server 114 that manages the backup and recovery of data, such as NetWorker™, available from EMC Corp. In operation, the BURA is used to schedule, create and manage local or remote replicas of data.

Figure 2:
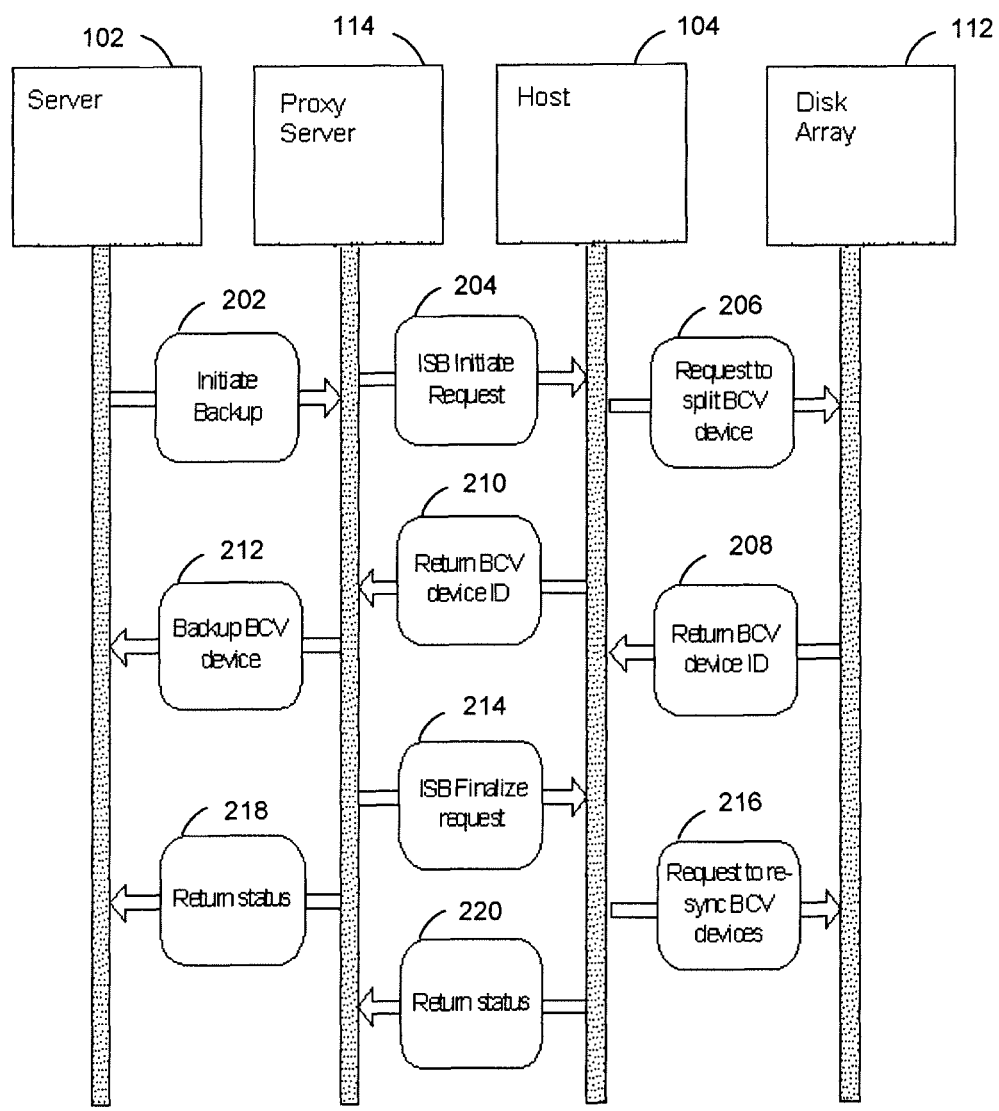
FIG. 2 is a schematic illustration of an exemplary data flow during an integrated serverless backup, according to an embodiment of the present invention.

A routine data backup can be classified as an integrated serverless backup (ISB), since hosts 104, 106 and 108 do not manage the process. In an ISB, data from storage array 112 is replicated. The data flow associated with this process is shown schematically in FIG. 2. As indicated, a backup request 202 is initiated by server 102, which is running a module of the backup and recovery application. The request is received by proxy server 114, which in step 204 calls the necessary application program interfaces (APIs) to initiate the backup process on host 104. Although host 104 is specified in this example, any host, server or combination thereof connected to SAN 120 can be targeted. Host 104 then sends the command to uncouple the clone and production disk volumes on storage array 112 in step 206. As used herein, storage array 112 may also be referred to as tape array 112 or disk array 112, which is not intended to narrow the scope of this disclosure or the invention. In this example, disk array 112 is a Symmetrix array, so the clone data is in a BCV and the production data is in a STD. Host 104 freezes its database so that a consistent image state is available at the point in time when the backup is requested. The BCV is split from the STD so that the backup can occur. In steps 208 and 210, disk array 112 returns the BCV identification to proxy server 114 through host 104. Proxy server 114 then sends the instruction to backup the BCV to server 102 in step 212, creating a point-in-time copy. Once server 102 has replicated or copied BCV on storage node 116, proxy server 114 calls host 104 in step 214 to finalize the backup. Host 104 then issues the necessary commands 216 to resynchronize the BCV and STD on disk array 112. Proxy server 112 signals 218 server 102 that the BCV is replicated and that the backup is complete.

As will be appreciated, the clone data can be used to generate backup without requiring a cessation in activity involving the production data. During normal operation, the production and clone volumes are linked or coupled so that data is written to both volumes concurrently. To conduct the backup, the production and clone volumes are uncoupled, also termed fractured or split, allowing the clone to be replicated. During the backup process, the production volume continues to be read and written. After the backup is completed, the clone volume are again coupled and synchronized with the production volume. Naturally, this is desirable because work using the database can continue while the backup is being performed.

Replication of the clone data to storage array 118 can be carried out either on disk array 112 or via storage node 116 to a desired storage media, such as a tape library. Depending upon the design of disk array 112, various strategies may be employed to create the point-in-time copy of the data, including without limitation BCV, cloning or snapshot technology.

In the event of a more serious loss of data, a process known as integrated disaster recovery (IDR) may be used to restore operation. As shown in FIG. 1, box 122 indicates that disk array 118 is at a remote location from the remainder of computer network system 100. As shown, SAN 120 extends to the remote location, linking disk array 118 with computer network system 100. As with an ISB, the creation of a IDR backup on disk array 118 involves splitting the production and clone volumes on disk array 112, allowing the cloned data to be replicated while the production data remains accessible. SAN 120 is used to establish a remote data facility (RDF) link between the clone or BCV volumes on disk array 112 and the production or STD volumes on disk array 118. As the data is backed up to the production volume on disk array 118, it is synchronized with a clone volume on disk array 118.

Figure 3:
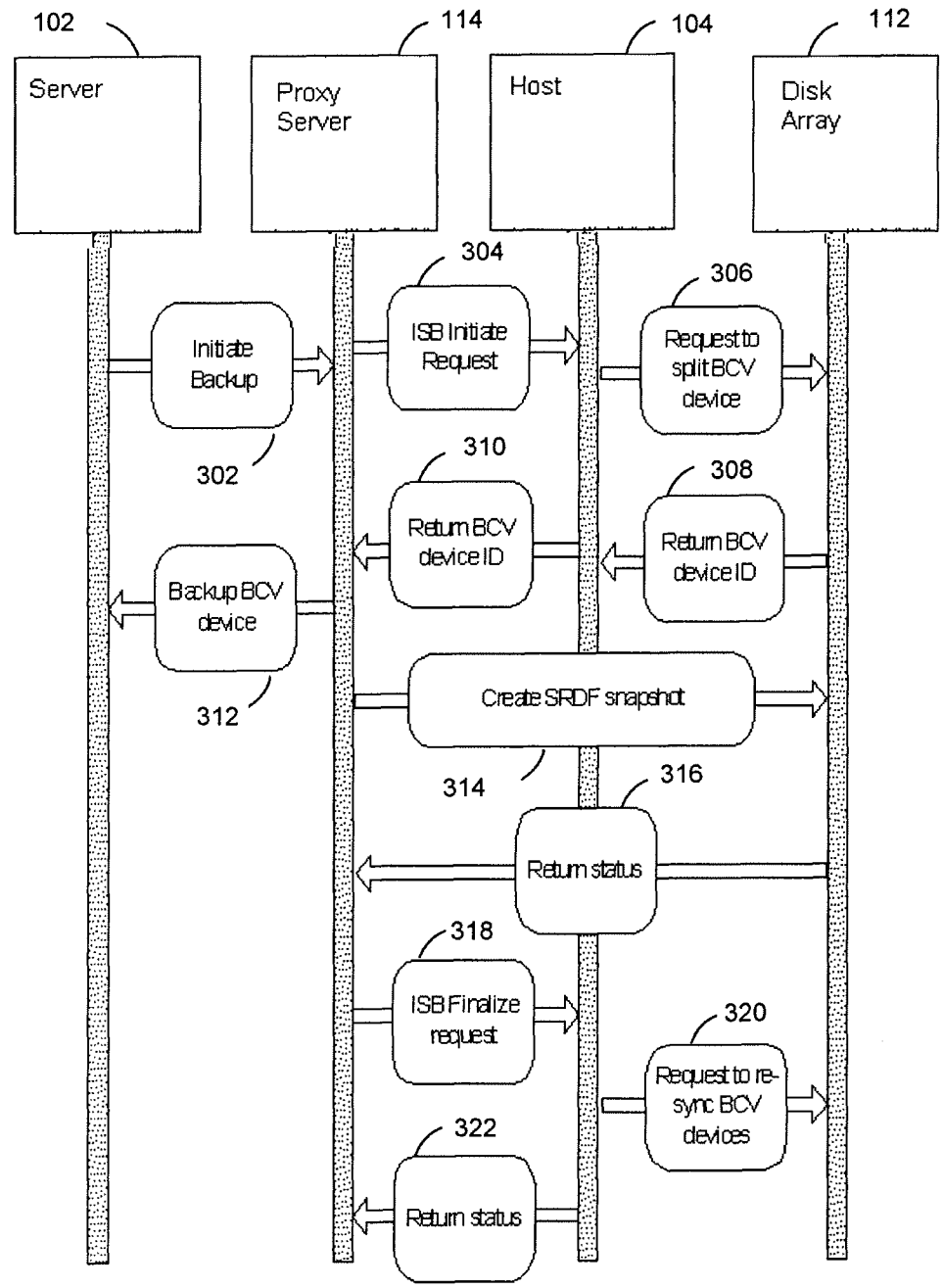
FIG. 3 is a schematic illustration of an exemplary data flow during an integrated disaster recovery backup, according to an embodiment of the present invention.

The data flow during an IDR process is shown schematically in FIG. 3. The process is similar to an ISB. A backup request 302 is initiated by server 102, which is received by proxy server 114, and calls 304 the APIs to initiate the backup process on host 104. Host 104 then sends the command 306 to split the BCV is split from the STD. In steps 308 and 310, disk array 112 returns the BCV identification to proxy server 114 through host 104. Proxy server 114 instructs 312 server 102 to backup the BCV. To provide IDR functionality, proxy server 114 directly commands 314 disk array 112 to establish the RDF link and create a snapshot of the BCV on remotely-located disk array 118. Disk array 112 signals 316 proxy server 114 upon completion of the RDF replication, and proxy server 114 calls 318 host 104 to finalize the backup. In step 320, host 104 then issues the necessary commands to resynchronize the BCV and STD on disk array 112. The IDR is completed in step 322 by host 104 signaling proxy server 114 that the backup is finished.

As discussed above, prior art backup and recovery applications designed for large databases typically rely upon image-based backup methods that involve a complete replication of each host. Although the speed of the replication process is improved, the data represented by each host can be significant. Further, it is often desirable to aggregate a plurality of hosts in a coherency group to ensure that all data related to a specific area is backed up simultaneously, even if that data is spread across several hosts. As such, the time and resources required to backup a coherency group is significant.

However, there are situations where it is desirable to backup a smaller amount of data. For example, a full backup may include a relatively small amount of incorrect data, such as a specific record may not be copied well or the storage device may have a bad sector. Prior to this invention, backup and recovery applications of the type discussed herein have required a full backup of a coherency group. At a minimum, this involves the replication of an entire host. As a result, significant amounts of time and system resources are required to correct even small defects in a backup.

The present invention provides computer network system 100 with logic capable of backing up data with increased granularity. Replication operations are possible in single segment units. Within the SAN, the physical storage media spread across hosts 104, 106 and 108, and all other storage accessible to the network, is partitioned into logical entities, or logical unit numbers (LUNs), which correspond to single data segments. Translating the physical media into LUNs creates a framework that allows the operating systems of the computer system network 100 to treat the disparate storage media as a linear address space comprised of fixed-size blocks for read and write operations. Accordingly, the systems and methods of this invention permit replication operations to occur at the LUN level, avoiding the need for replicating one or more hosts when an error is confined to a single segment.

Figure 4:
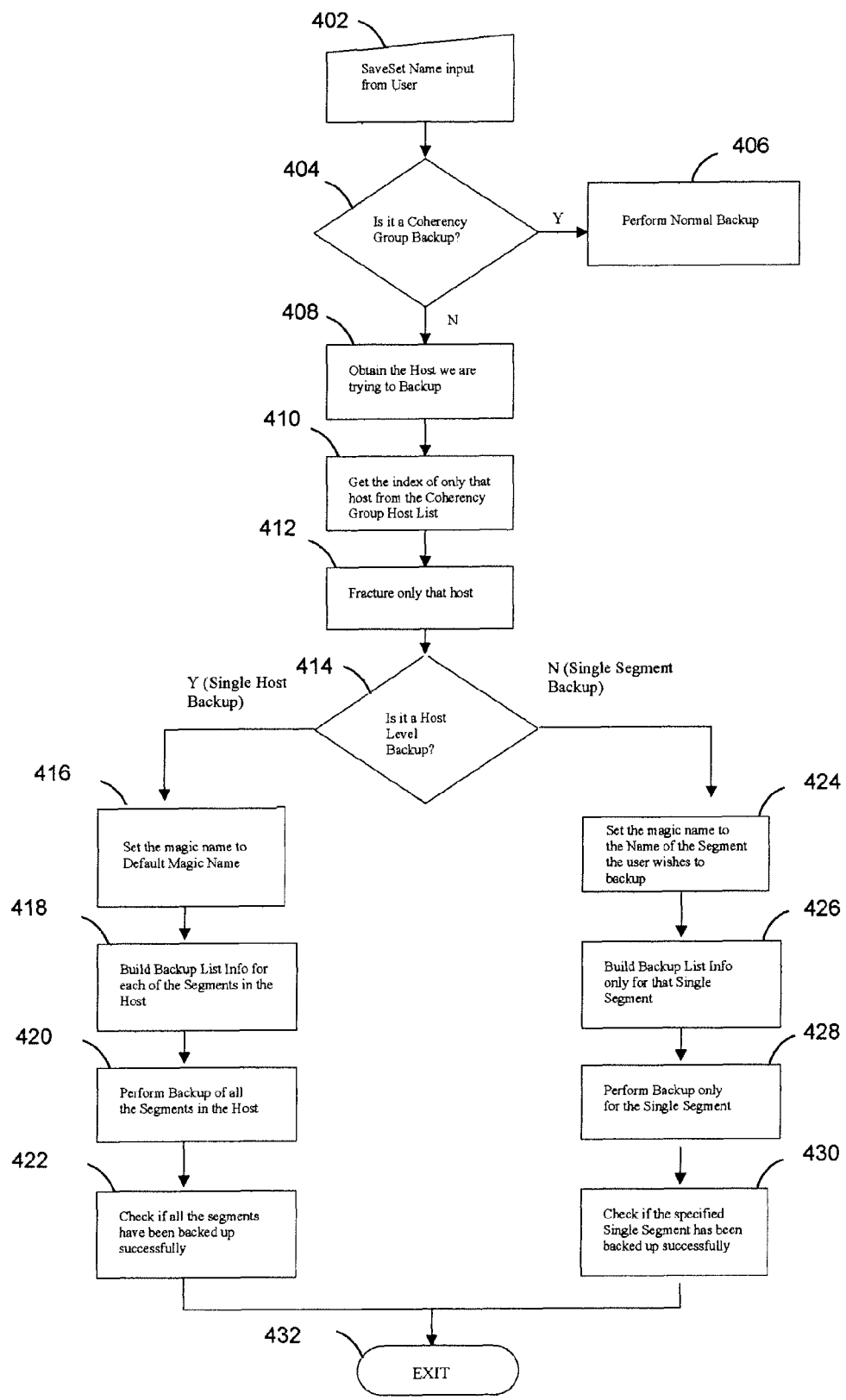
FIG. 4 is an exemplary flow diagram illustrating a process for backing up a single segment of data within the computer system network, according to an embodiment of the present invention.

FIG. 4 illustrates a flow chart that including the steps associated with backing up a single data segment on computer system network 100. Typically, backups limited to a single data segment are performed as part of a manual backup as opposed to being an automated process. The process begins at step 402 with the user entering the backup commands and specifies a saveset indicating the data that is to be replicated. The saveset syntax is configured to establish the coherency group, the host and the segment. In step 404, the saveset name is parsed to determine what level of backup is being requested. If the saveset indicates that an entire coherency group is to be backed up, then a conventional replication process is initiated in step 406.

Otherwise, the desired host name is determined from the input saveset in step 408 and an index of that host is retrieved from the coherency group host list in step 410. In step 412, the production data from the specified host is fractured from the clone in preparation for the replication process.

In step 414, the input saveset is parsed to determine whether a single segment on the host has been specified to determine if the requested backup is a host level backup.

If no segment is specified, a host level backup results and the segment specification is set to a default wildcard, such as "*". Step 418 builds a backup list for the host including all segments. The replication APIs use the backup list to produce a backup of all segments on the host in step 420. The backup is checked in step 422 to verify that the backup was successful. Alternatively, if the saveset includes a segment, then the segment specification is set to that name in step 424. Accordingly, step 426 builds a backup list that corresponds just to the specified segment. The replication APIs used the backup list to produce a backup of only the single segment in step 428. Step 430 checks the single segment backup to confirm that the replication was successful. Upon verification in step 420 or 430, the process exits in step 432.

The above process can be applied to perform single segment backups of databases. For example, MAGIC™ is a health care information database available from MEDITECH of Westwood, Mass. MAGIC is an operating system abstraction layer (OSAL) based application, capable of managing data related to aspects of health information management, facilities and services, including revenue cycle, scanning and archiving, scheduling and referral management, emergency department, enterprise medical records, patient care and patient safety, physician care manager, anatomical pathology, blood bank, laboratory and microbiology, imaging and therapeutic services, operating room management, pharmacy, cost accounting, data repository, general accounting, human resource planning, supply chain management, patient discharge instructions, patient education, and the like. A similar application is MEDITECH C/S 6.0, also available from MEDITECH, which is a client server based application.

In a backup process configured for MAGIC, the saveset name follows the syntax: <Coherency Group Name>/<Host Name>/<Segment Name>. Thus, a single segment backup is invoked by specifying a segment in the saveset name, for example through the command line:

nsrmedisv-s meditech1-N MEDI:ISB_CG/10.31.79.111/SEGMENT-A-CLAR

In this example, "ISB_CG" is the coherency group, "10.31.79.111" is the host name and "SEGMENT-A-CLAR" is the segment name. Correspondingly, a host level backup employs a saveset containing <Coherency Group Name>/<Host Name>. Thus, an exemplary backup can be invoked with the command line:

nsrmedisv-s meditech1-N MEDI:ISB_CG/10.31.79.111

A backup process configured for MEDITECH C/S employs the same concepts with a context appropriate to that application. For example, a backup of all servers is initiated by a background job process (BJP) having the wildcard "*" as an argument. The Initiate reply will have the string of all C/S servers on the network and results like ERR or Server name and info. An example of the results is:

SYM=00135708376:106:CCR-FS1:04/11/10.05.28,
SYM=00135708376:106:CCR-FS2:04/11/10.05.30,
ERR=CCR_FS3:04/11/10.05.28 . . . .

Similarly, a backup of one server can be accomplished by sending an initiate command to the BJP specifying the hostname and using the wildcard "*" to specify all segments. For example, using the saveset "CCR-FS2*" will backup all segments on the FS2 server.

To perform a single segment backup on a MEDITECH C/S system, the segment name is specified in the saveset, resulting in the backup of just that segment on the server. For example, an initiate command using "CCR-FS2 E" will backup the E: segment on the FS2 server. Any combination of full servers and single segments can be specified. For example, an initiate command using "CCR-FS1*, CCR-FS2*, CCR-FS3 E" will backup all segments on servers FS1 and FS2 and just the E: segment on the FS3 server.

One will appreciate that in each of the above examples, once the specified single segment has been backed up, it may be added to the full backup of the host(s). This may occur in an instance where a previous backup of the host failed to backup the specified single segment, and so the method of the present invention is utilized to identify and select the "missing" segment, then add it to the previous full backup. Alternatively, a previous full backup may include a corrupted or damaged backup of the single segment. In this case, the single segment backup may be used to replace the corrupted or damaged segment in the full backup. In such a case the single segment backup may be said to correspond to the corrupted or damaged segment in the full backup, and the single segment backup may therefore replace the corresponding corrupted or damaged segment in the full backup. One skilled in the art will appreciate that there may be other uses for single segment backup beyond replacing or adding to portions of a previous full backup, and that the examples discussed herein are not meant to limit the invention in any way.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. A method for backing up data of a host comprising:

providing a computer network system that includes one or more hosts having data stored in a physical storage media spread across the one or more hosts;

partitioning the physical storage media into a plurality of segments, wherein the plurality of segments are image-based and saved as a full backup on a storage array on the computer network system and each segment is a fixed-sized block of data;

identifying a single segment of the full backup that is corrupted or damaged;

creating a substitute single segment that is an image-based backup of the data corresponding to the identified single segment; and replacing the identified single segment in the full backup with the substitute single segment.

2. The method of claim 1, wherein creating a single segment backup comprises building a backup list for the single segment.

3. The method of claim 1, wherein the full backup comprises a set of production data and a set of clone data that mirrors the production data, and wherein creating the image-based backup further comprises:

uncoupling the production data and the clone data;

replicating a single segment of data from the clone data; and synchronizing the production data and the clone data.

4. The method of claim 3, wherein uncoupling the production data and the clone data is performed only on a host that contains the single segment of data.

5. A non-transitory computer readable medium containing computer readable instructions for backing up data stored in a physical storage media spread across one or more hosts, the computer readable instructions comprising:
   computer program code for partitioning the physical storage media into a plurality of segments, wherein the plurality of segments are image-based and saved as a full backup on a storage array on the computer network system and each segment is a fixed-sized block of data;
   computer program code for identifying a single segment of the full backup that is corrupted or damaged; and
   computer program code for creating a substitute single segment that is an image-based backup of the data corresponding to the identified single segment; and
   replacing the identified single segment in the full backup with the substitute single segment.

6. The non-transitory computer readable medium of claim 5, wherein creating a single segment backup comprises building a backup list for the single segment.

7. A system for backing up data of one or more hosts comprising:
   the system having data stored in physical storage media, wherein the physical storage media is partitioned into a plurality of image-based segments comprising a plurality of fixed-sized blocks of data, the one or more hosts in communication with a server that stores a full backup copy of data from the one or more hosts;
   a storage array for storing the full backup copy of data; and
   a proxy server relaying commands associated with backing up the data between the one or more hosts, the server, the disk array and the proxy server, wherein the system is configured to identify a single segment of the full backup that is corrupted or damaged, create a substitute single segment that is an image-based backup of the data corresponding to the identified single segment and replace the identified single segment in the full backup with the substitute single segment.

8. The system of claim 7, wherein the full backup comprises a set of production data and a set of clone data that mirrors the production data, and wherein creating an image-based backup of the single segment further comprises:
   uncoupling the production data and the clone data;
   replicating a single segment of data from the clone data; and
   synchronizing the production data and the clone data.

9. The system of claim 8, wherein uncoupling the production data and the clone data is performed only on a host that contains the single segment of data.

10. The system of claim 8, wherein the system is configured to build a backup list for the single segment.

\* \* \* \* \*